Oct. 15, 1957  H. A. SPERLICH  2,809,847
FRAME BALANCING MECHANISM
Filed May 26, 1953

INVENTOR.
Herman A. Sperlich.
BY
Harness, Dickey & Pierce
ATTORNEYS.

Oct. 15, 1957   H. A. SPERLICH   2,809,847
FRAME BALANCING MECHANISM
Filed May 26, 1953   2 Sheets-Sheet 2
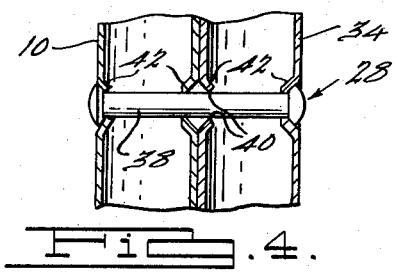
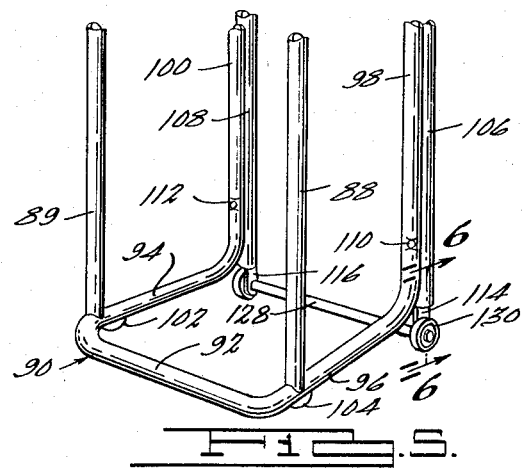
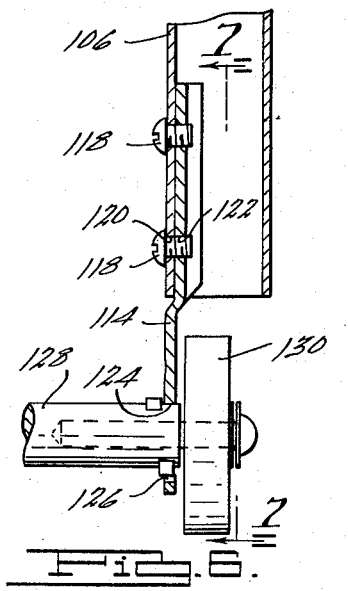
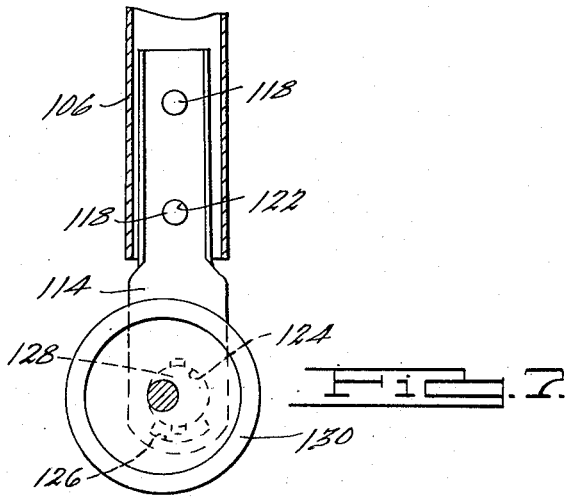
INVENTOR.
Herman A. Sperlich.
BY
Harness, Dickey & Pierce
ATTORNEYS.

United States Patent Office 2,809,847
Patented Oct. 15, 1957

2,809,847

FRAME BALANCING MECHANISM

Herman August Sperlich, Highland Park, Mich., assignor to Ironrite, Inc., Mount Clemens, Mich., a corporation of Michigan Application May 26, 1953, Serial No. 357,499

3 Claims. (Cl. 280—6)

This invention relates generally to portable stands and, more particularly, to a novel stand or frame balancing mechanism for use on portable stands adapted to support an apparatus, such as a household appliance or the like.

In recent years, the manufacturers of various household appliances, tools and other devices have endeavored to increase the usefulness and adaptability of their products by mounting them on portable stands or frames. However, it has been found that the advantage of portability in many instances is offset by the fact that the floor or supporting surface is uneven in the area where it is desired to use the appliance, or tool, thereby producing an unsteady and sometimes a malfunctioning apparatus.

Accordingly, with the aforementioned in view, it is an object of this invention to provide an improved portable stand or frame adapted to carry various apparatus such as a household appliance, a tool or the like, and which is provided with a novel balancing mechanism to insure positive contact at all times between the supporting portions of the stand and any uneven floor or supporting surface.

It is another object of this invention to provide an improved portable stand having an automatic leveling base embodying a novel equalizer shaft and roller assembly.

It is a further object of this invention to provide a novel frame balancing mechanism for portable stands which is relatively inexpensive to manufacture due to its simple and compact construction, and which may be easily adapted for installation on portable stands now in use.

These and other objects of this invention will become apparent from the following detailed description, taken in conjunction with the accompanying drawings, in which:

Fig. 4 is a fragmentary sectional view taken substantially on the line 4—4 of Fig. 2;

Fig. 5 is a perspective view of a modified portable stand embodying the invention;

Fig. 6 is a fragmentary elevational view partly in section of the structure illustrated in Fig. 5, taken substantially on the line 6—6 thereof; and Fig. 7 is a fragmentary sectional view of the structure illustrated in Fig. 6 taken substantially on the line 7—7 thereof.

Figure 1:
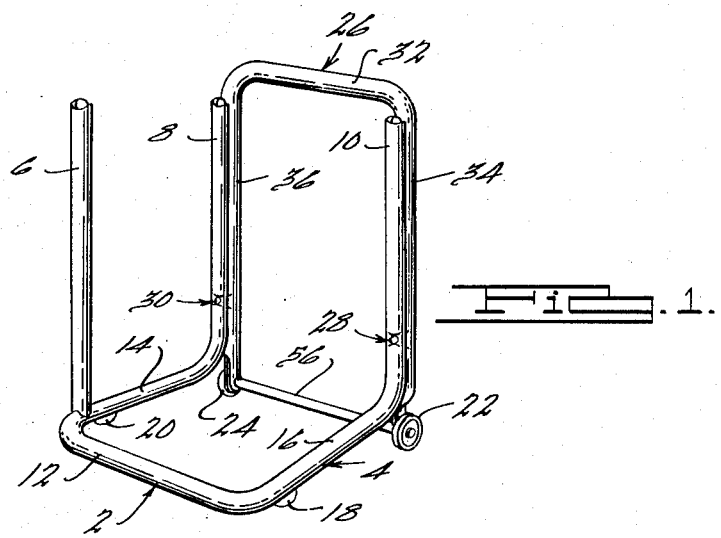
Figure 1 is a perspective view of a portable stand embodying the invention.
Figures 2, 3:
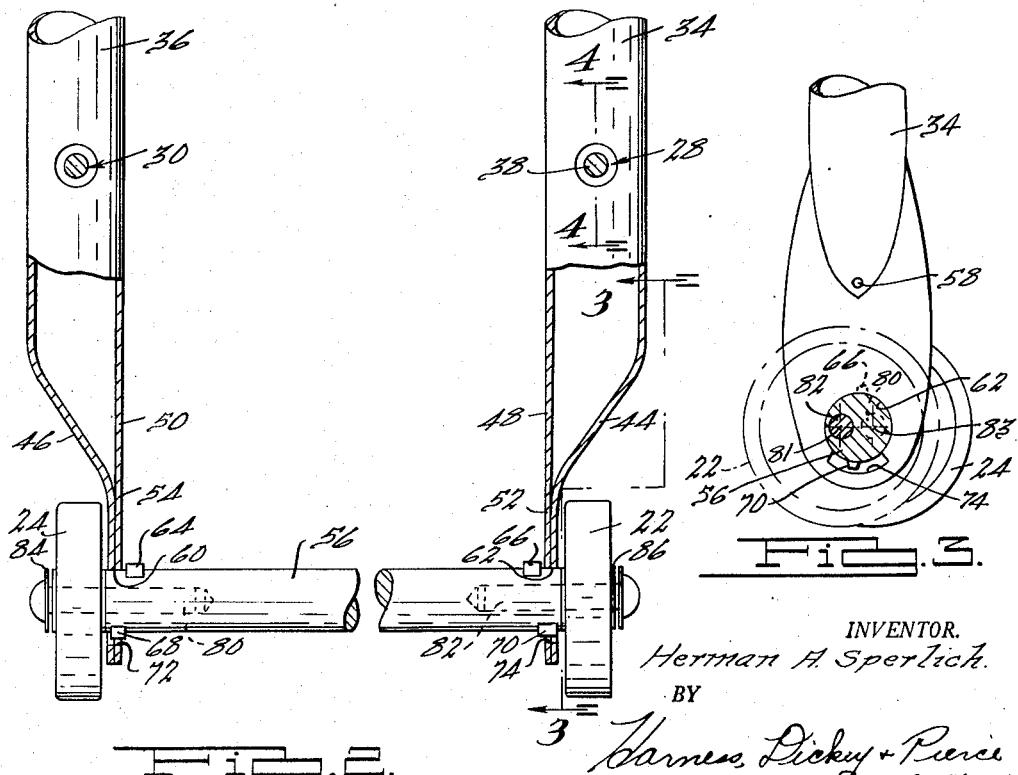
Fig. 2 is a fragmentary front elevational view partly in section of the novel frame balancing mechanism embodied in the portable stand of Fig. 1.
Fig. 3 is a fragmentary view partly in section of the structure illustrated in Fig. 2, taken substantially on the line 3—3 thereof.

Referring now to the drawings, and, more particularly, to Figs. 1 through 4, the illustrative embodiment of the invention comprises a portable stand 2 having a horizontal base member 4 provided with a plurality of upwardly extending vertical leg members 6, 8 and 10. The base member 4 includes a transverse horizontal front section 12 and a pair of integrally formed and rearwardly extending horizontal sections 14 and 16. Integrally attached at the rearward end of the base sections 14 and 16 are the two upwardly extending leg members 8 and 10. Fixedly mounted, as by welding, on the forward left corner of the base member 4 is the vertically extending leg member 6 which is adapted to coact with the leg members 8 and 10 to support an apparatus, such as a household appliance, a tool, or the like. The base and leg members are preferably fabricated from a lightweight tubing with the leg members 8 and 10, and the base member 4 being formed from a continuous length of tubing.

The forward end of the base member 4 is provided on the lower side thereof with a pair of resilient support pads 18 and 20 which may be made from any suitable material such as rubber or the like. The rearward end of the stand is supported by a pair of casters or rollers 22 and 24 which are rotatably mounted on a separate stand handle member generally designated 26 rigidly secured to the legs 8 and 10 by means of rivet joints 28, 30.

The handle member 26 comprises an upper horizontal section 32 having integrally attached to the ends thereof a pair of downwardly extending legs sections 34, 36 secured, as previously mentioned, to the leg members 8 and 10 by the rivet joints 28 and 30 respectively. As is best seen in Fig. 4, the rivet joints 28 and 30 comprise a rivet 38 seated in apertures, as 40, formed in depressed portions as 42 of the adjacent legs. The lower ends of the leg sections 34, 36 have the outer walls 44, 46 thereof flattened against the inner walls 48, 50, respectively, which may be accomplished by any suitable method as by swaging, to provide suitable flattened portions as 52, 54 adapted for rotatably mounting the equalizer shaft 56. The outer walls 44 and 46 are each provided with a drain hole 58 to provide an outlet for any fluid which may collect in the vertical leg sections 34, 36.

The flattened portions 52, 54 of the leg sections 34, 36 are provided with apertures 60, 62 in which is rotatably mounted the equalizer shaft 56. The equalizer shaft 56 is provided on the upper side thereof with a pair of raised portions 64, 66 formed thereon by any suitable method as by swaging, said raised portions serving to space the leg sections 34, 36 on the equalizer shaft 56. The lower side of the equalizer shaft 56 is provided with two downwardly extending portions 68, 70 formed thereon by any suitable method as by swaging and which serve to limit the rotation of said shaft in the apertures 60 and 62 of the flattened portions 52 and 54. The apertures 60 and 62 are each provided on the lower side thereof with an arcuate extension 72, 74 of approximately 110° into which the downwardly extending portions 68 and 70 are slidably received. The arcuate extensions 72, 74 of the apertures 60, 62 may be extended from the suggested limit of 110° up to a maximum of about 170° if desired. However, considerable experimentation has shown that unsatisfactory operation occurs when a large arcuate extension is used. For example, it has been found that when the equalizer shaft 56 is rotated to an angle of approximately 180°, a locked condition occurs which is caused by the inherent low torque existing when the roller centers 81, 83 approach the vertical axis of the shaft. Another obvious reason for employing an arcuate extension less than 180° is to prevent the equalizer shaft 56 from dropping into said arcuate extension when the stand is raised off the supporting surface. Accordingly, for best practical operation of the invention, a limit of about 110° is desirable. An arcuate extension of such size provides optimum conditions of operation. A pair of casters or rollers 22, 24 are rotatably mounted on the outer ends of the shaft 56 by means of pins 80, 82 which are positioned on centers 81, 83 offset from the center of rotation of the equalizer shaft 56. The pins 80, 82 are provided with washers 84, 86 between the heads of the pins and the rollers 22, 24. It will be apparent that the rollers 22, 24 may be unequally positioned off the center of the equalizer shaft 56 if desired, and that the functional limit of the novel leveling mechanism is dependent on the amount that the rollers 22, 24 are positioned off the center of shaft 56.

A modified embodiment of the invention shown in Figs. 5, 6 and 7 comprises a portable stand similar to the embodiment of Fig. 1 but employing a modified structure for attaching the rollers to the stand and having in addition a second forwardly mounted leg member 88.

More specifically, the modified emobdiment has a base member 90 comprising, a front horizontal section 92, and two integrally formed and rearwardly extending horizontal sections 94, 96 on which are integrally formed at the rearward ends thereof upwardly extending leg members 98, 100. Fixedly mounted by any suitable means, as by welding, on the forward end of the horizontal base sections 94, 96 are a pair of upwardly extending leg members 88, 89. The upper ends of the leg members 88, 89, 98 and 100 are adapted to carry an apparatus such as a household appliance, a tool, or the like. Mounted on the underside of the forward end of base sections 94, 96 are resilient support pads 102 and 104 which may be made from rubber or the like. Fixedly attached to the rearward side of leg members 98 and 100 are two vertical members 106 and 108, the upper ends of which may be joined together in any suitable manner to form a handle portion such as the handle portion 32 of the embodiment of Fig. 1. The vertical members 106 and 108 are preferably attached to leg members 98 and 100 by rivet joints 110 and 112 similar to the rivet joints 28 and 30. The various leg members and base sections may be made from any suitable material but are preferably made from a suitable lightweight tubing.

The lower ends of the vertical members 106 and 108 are open and adapted to slidably receive the flanges or flat members 114 and 116. The upper ends of the flange members 114 and 116 have an arcuate cross section and are secured to the inner side of the vertical members 106 and 108 by any suitable means as by metal screws 118 passing through apertures 120 in the outer wall portion of the legs 106 and 108 into a threaded aperture 122 in the flange members 114 and 116.

The lower ends of the flange members 114 and 116 are provided with an aperture 124 having an arcuate extension on the lower side thereof as at 126. Rotatably mounted in the aperture 126 is an equalizer shaft 128 similar to the shaft 56, the shaft 128 having rotatably mounted on the ends thereof off center positioned rollers 130. It will be appreciated that the suggested limitation and reasons therefor concerning the size of the arcuate extension for the embodiment of Fig. 1 is also applicable to the arcuate extension 126 of the modified embodiment of Fig. 5.

In operation, when one of the rollers 22, 24 engages a depression in the supporting surface, said roller will move downwardly carrying with it one end of the equalizer shaft 56 and the stand will then automatically pivot about the center of said roller, creating a torque which rotates the equalizer shaft 56 to maintain the stand on a substantially level plane with both rollers in contact with the uneven supporting surface.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a portable stand construction, an upright support having a pair of spaced legs, an automatic leveling mechanism attached to the lower ends of said legs comprising, a shaft journaled for rotation in said legs, an outwardly projecting axle mounted in each end of said shaft in an off-center position, and a roller mounted on each said axle, cooperating means carried by said legs and said shaft restricting the rotation of said shaft to less than 180 degrees, whereby when one of said rollers moves vertically, said stand automatically pivots about the center of said roller and creates a torque which rotates said shaft thereby maintaining the other of said rollers in contact with the supporting surface and said stand on a substantially level plane.

2. In a portable stand construction, an upright support having a pair of downwardly depending spaced tubular legs, the lower end of each of said legs being flattened and provided with an aperture, an automatic leveling mechanism carried by the lower ends of said legs comprising, a shaft rotatably mounted in said apertures, an outwardly projecting axle mounted in each end of said shaft in an off center position and a roller rotatably mounted on each said axle, cooperating means carried by said legs and said shaft adapted to restrict the rotation of said shaft to about 55 degrees in either direction from a vertical plane passing through the horizontal axis of said shaft, whereby when one of said rollers moves vertically, said stand automatically pivots about the center of said roller and creates a torque which rotates said shaft thereby maintaining the other of said rollers in contact with the supporting surface and said stand on a substantially level plane.

3. A portable stand construction as claimed in claim 2 wherein said cooperating means consists of a segmental enlargement of at least one of said apertures disposed along the lower peripheral portion thereof and extending less than 90 degrees in either direction from a vertical plane extending through the horizontal axis of said shaft, and outwardly projecting means on said shaft so disposed as to oscillate within said segmental enlargement.

References Cited in the file of this patent

UNITED STATES PATENTS

| | | |
|---|---|---|
| 842,804 | Murrell | Jan. 29, 1907 |
| 2,434,140 | Bernstein | Jan. 6, 1948 |
| 2,534,256 | Fischer | Dec. 19, 1950 |
| 2,542,244 | Gerhardt et al. | Feb. 20, 1951 |
| 2,555,722 | Wilkie | June 5, 1951 |

FOREIGN PATENTS

| | | |
|---|---|---|
| 669,695 | France | Aug. 10, 1929 |